| United States Patent [19] | [11] | 4,173,618 |
|---|---|---|
| Holtz | [45] | Nov. 6, 1979 |

[54] PROCESS FOR REMOVAL OF ALUMINA FROM AQUEOUS ALKALI METAL CHROMATE SOLUTIONS

[75] Inventor: John W. Holtz, Solvay, N.Y.

[73] Assignee: Allied Chemical Corporation, Morristown, N.J.

[21] Appl. No.: 731,187

[22] Filed: Oct. 12, 1976

[51] Int. Cl.$^2$ .............................................. C01G 37/14
[52] U.S. Cl. ....................... 423/58; 423/118; 423/596
[58] Field of Search ................... 423/55, 58, 118, 596

[56] References Cited

U.S. PATENT DOCUMENTS

| 2,839,359 | 6/1958 | Dunning | 423/58 |
| 3,819,800 | 6/1974 | Shaffer et al. | 423/58 |
| 3,890,427 | 6/1975 | Dewey et al. | 423/118 |
| 3,899,568 | 8/1975 | Frick et al. | 423/55 |

FOREIGN PATENT DOCUMENTS 273666  1/1928  United Kingdom ............ 423/58

OTHER PUBLICATIONS

Kashiwase et al., "Nippon Kagaku Kaishi" Aug. 1976, No. 8, pp. 1211-1215.

Primary Examiner—Herbert T. Carter
Attorney, Agent, or Firm—Michael S. Jarosz; Anthony J. Stewart

[57] ABSTRACT

Process is provided for removal of alumina from aqueous alkali metal chromate solutions containing the same, which comprises contacting the aqueous solution with a soluble-silica compound under conditions sufficient to effect reaction of alumina with silica for formation of crystalline alkali metal alumino silicate, and removing the crystalline alkali metal alumino silicate from the reaction mixture.

4 Claims, 2 Drawing Figures

PROCESS FOR REMOVAL OF ALUMINA FROM AQUEOUS ALKALI METAL CHROMATE SOLUTIONS

BACKGROUND OF THE INVENTION

1. Field of the Invention

This invention relates to the removal of alumina from aqueous alkali metal chromate solutions containing the same, and more specifically, to the removal of alumina from said solutions by reaction with soluble silica.

2. Description of the Prior Art

Hexavalent chromium compounds such as alkali metal chromates (e.g., sodium chromate), alkali metal bichromates (e.g., sodium bichromate) and other chrominum compounds, useful in such diverse industries as the plating of metals, tanning of leather and the manufacture of pigments, are typically produced from chromite ore such as $FeOCr_2O_3$. The ore is generally subjected to a high temperature alkaline oxidation (e.g., temperatures in the order of about 2,000° to 2,500° F.), usually in the presence of an alkali metal carbonate (e.g., soda ash and/or potassium carbonate) or alkali metal hydroxide (e.g., sodium hydroxide) with the consequent formation of alkali metal chromate. Other alkaline materials such as lime (or other CaO-containing material) and MgO may also be added.

The oxidation step is then followed by water leaching of the oxidized ore to produce a "yellow liquor" comprising an aqueous solution of alkali metal chromate, contaminated with water-soluble impurities such as alumina which are originally present in the ore. Subsequent treatment of the yellow liquor to obtain the desired hexavalent chromium compounds varies widely. The yellow liquor has been treated with an acidic material such as sulfuric acid to oxidize the alkali metal chromate to bichromate, thereby forming a solution of alkali metal bichromate and by-product alkali metal sulfate, containing the water-soluble impurities such as alumina carried to the yellow liquor during leaching. In other processes, the yellow liquor has been treated by contacting the liquor with carbon dioxide as the acidic material, in which case alkali metal bicarbonate rather than alkali metal sulfate is formed as by-product in the resultant bichromate solution. (See, e.g., U.S. Pat. No. 1,760,788). Likewise, by-product alkali metal bisulfate (see, e.g., U.S. Pat. No. 3,715,425) and alkali metal bichromate (see, e.g., Encyclopedia of Chemical Technology, Vol. 3, pg. 50; Kirk & Othmer, eds.; 1954) have been used as the acidic material in place of the sulfuric acid in the treatment of the yellow liquor for production of the bichromates.

In such processes, recovery of the bichromate is generally effected by concentrating the aqueous solution containing the bichromate to precipitate the by-product alkali metal sulfate or bicarbonate (depending on which acidic material is employed to treat the yellow liquor), removing the precipitate from the concentrated solution, followed by crystallizing alkali metal bichromate from the purified concentrated liquor. However, the concentration step generally also results in removal of a portion of the alumina from solution, which forms a suspension of alumina. Since the presence of by-product alumina in the crystallization step results in contamination of the bichromate crystals, removal of the alumina precipitate from the concentrated solution prior to crystallization is necessary. The presence in the concentrated solution of even very small quantities of suspended alumina greatly impairs the efficiency of separation of this precipitate from the aqueous solution.

To avoid alumina separation problems the prior art has sought to convert the alumina in the chromite ore to an insoluble form during the roasting step by adding lime or other materials to the roast mix. Such high lime roasts generally form a low-level alumina yellow liquor upon subsequent leaching, i.e. containing from about 0.35 to 1.0 weight percent CTB $Al_2O_3$ (as this term is defined below). However, this process has never been entirely successful due to the difficulty in obtaining the precise conversion desired. Deficiencies of lime result in a yellow liquor containing excessive amounts of solubilized alumina, while excess of lime causes the physical consistency of the roast to be changed during leaching from a granular, porous material to a slimy, non-draining form, which seriously impairs the leaching operation. To avoid the formation of the non-draining form of roast, careful and strict control of the amount of lime relative to the quantity of alumina in the ore is necessitated, thereby leading to increased expenses in processing the ore.

To allow use of lower lime quantities, other processes have employed higher amounts of alkali metal carbonates and/or hydroxides in the chromite ore mix roasting step to open up the ore. However, the increased alkali metal carbonate and/or hydroxide increases the amount of alumina solubilized in the yellow liquor. Moreover, any unreacted sodium carbonate is converted during roasting to anhydrous sodium hydroxide ($Na_2O$), which then forms sodium hydroxide in the subsequent leaching step, leading to a substantial increase in the alkalinity of the leach liquor. Raw material costs in the subsequent acidification step (to convert chromate values to bichromate) are correspondingly increased.

Other processes dealing with the removal of alumina include:

(1) British Pat. No. 1,057,678 (1967) employs a no- or low-lime roast and leaches the roast with acid solutions to a pH of 4 to 9.

(2) U.S. Pat. No. 1,760,788 (1930 to Specketer et al.) admixes bauxite or other alumina-rich material and soda ash with the chromite ore; roasts to form sodium aluminate; extracts the roast with water to form a leach liquor containing dissolved sodium aluminate and sodium chromate and smaller amounts of sodium silicate, caustic soda and soda ash; and heats the leach liquor to at least 100° C. to react the dissolved sodium silicate with a certain quantity of alumina whereby the silicic acid is almost completely separated in the form of sodium-aluminum silicate. Alumina is stirred out after removal of the sodium-aluminum silicate and separation is completed by introducing $CO_2$. Alternatively, the leach liquor may be first contacted with $CO_2$ to separate alumina.

(3) U.S. Pat. No. 1,948,143 (1934 to Tarr) roasts the ore together with an alkaline earth refractory material (e.g., lime), an alkali base (e.g., soda ash) and leached residue from the subsequent step containing an alkaline earth metal chromate, using a two-stage roast.

(4) U.S. Pat. No. 3,899,568 (1975 to Frick et al.) acidifies alkaline chromate leach liquors in two stages to precipitate alumina as a more easily separable alumina trihydrate.

The two-stage roast of Tarr and the two-stage acidification of Frick et al. require careful control to achieve the desired separation of alumina, and the processes of British Pat. No. 1,057,678 and Speckerter et al. do not avoid the problem of separating the finely precipitated alumina. Indeed, Speckerter et al. add to the difficulty of alumina removal by employing an alumina-rich diluent (bauxite) in the roasting stage.

SUMMARY OF THE INVENTION

According to the present invention, a process is provided for removal of alumina from an aqueous alkali chromate solution containing the same wherein the aqueous solution is contacted with a soluble-silica compound under conditions sufficient to effect reaction of alumina with silica for formation of crystalline alkali metal alumino-silicate. The alkali metal alumino silicate is then removed to yield an aqueous metal chromate solution having decreased levels of dissolved alumina.

The present invention has been surprisingly found to effect rapid formation of alkali metal alumino-silicate solids which are of a crystalline form easily removed from solution. Thus, the process of the present invention may be employed to provide continuous alumina removal from aqueous alkali metal chromate solutions with minimal equipment requirements, and may be readily adapted to existing manufacturing facilities. In addition, the present invention decreases the amount of lime or other alkaline earth refractory diluents employed during roasting, thereby effecting considerable raw material savings.

DETAILED DESCRIPTION OF THE INVENTION

Figure 1:
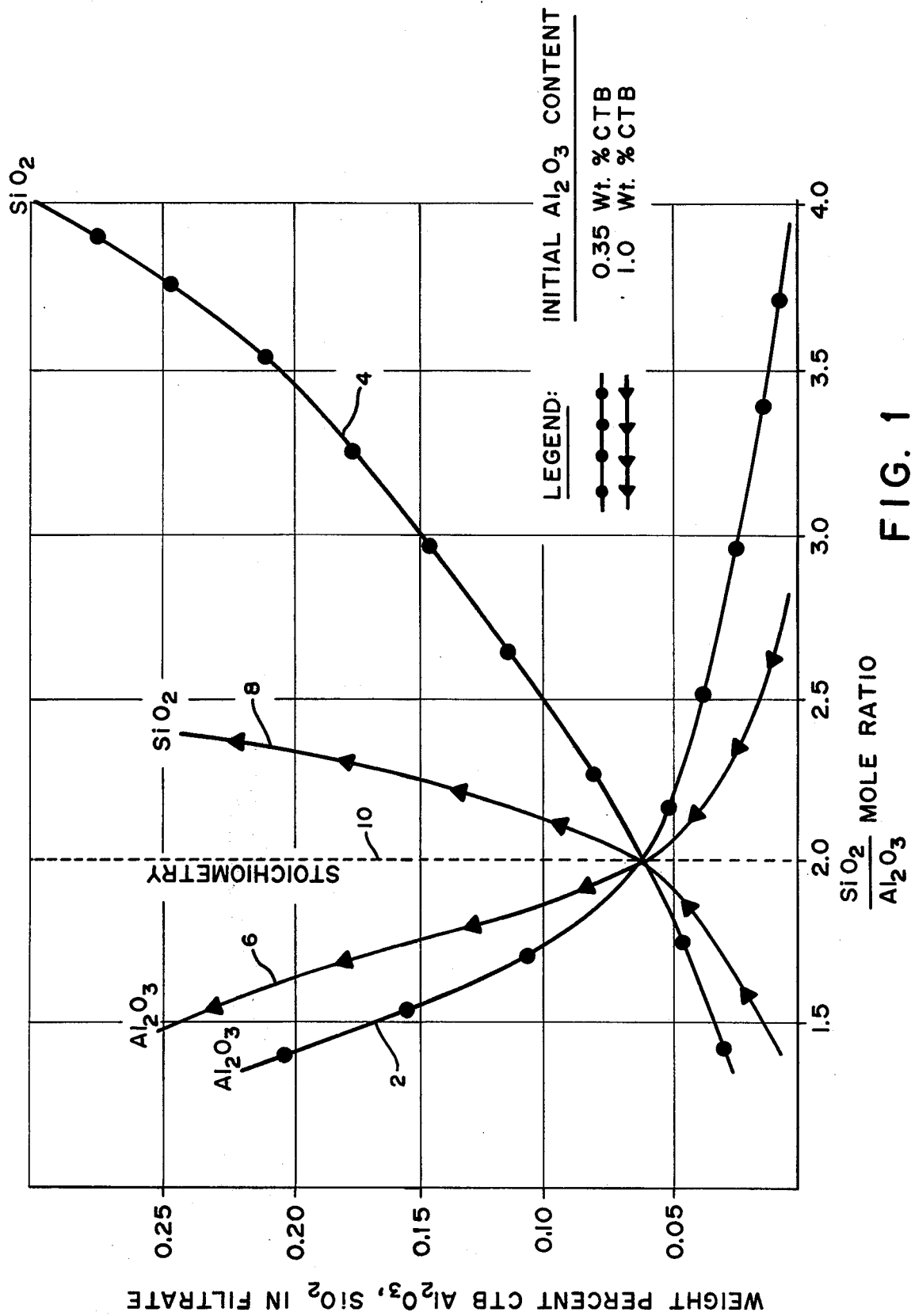
FIG. 1 illustrates the dissolved $Al_2O_3/SiO_2$ equilibrium for various amounts of $SiO_2$ added to an aqueous sodium chromate solution in accordance with the process of the present invention.

The composition of the alkali metal chromate solutions which may be treated in accordance with the present invention for removal of alumina may vary widely. Typically, however, such solutions will contain from about 15 to 45 weight percent CTB alkali metal chromate; up to about 20 weight percent, and preferably from about 1 to 20 weight percent, CTB alumina; up to about 20 weight percent, and preferably from about 5 to 15 weight percent, CTB alkalinity (as alkali metal carbonate) or up to about 15 weight percent CTB alkalinity (as alkali metal hydroxide); and from about 0.01 to 2 weight percent CTB silica ($SiO_2$), which silica content increases correspondingly with the above alumina concentrations. These solutions may also contain from about 2 to 6 weight percent CTB alkali metal sulfate as $SO_4^{--}$ as, for example, due to the formation of alkali metal sulfate in the roasted ore by reaction of sulfur in the fuel (e.g., coal or fuel oil) with the alkali metal carbonate or hydroxide employed in the roasting step and the subsequent dissolution of the sulfate during leaching of the roasted ore.

As used herein, the term "weight percent CTB" is intended to mean the weight percent of a given component of the aqueous solution calculated to bichromate basis, as determined by the following expression (I):

$$\text{Weight Percent } CTB = \frac{W}{B.E.} \times 100 \qquad (I)$$

wherein W corresponds to the actual weight percent concentration of the component (e.g., alumina) in the aqueous alkali metal chromate solution, basis the weight of the total solution, and "B.E." is the "bichromate equivalent" weight percent and is determined by the following expression (II):

$$B.E. = \frac{\text{Mol. wt. } X_2Cr_2O_7 \cdot 2H_2O}{2(\text{Mol. wt. } X_2CrO_4)} (T) \qquad (II)$$

wherein X is the alkali metal in the aqueous alkali metal chromate solution which is sought to be recovered (e.g., as the chromate or bichromate) and T is the amount of alkali metal chromate in the solution, as expressed as weight percent of the total solution. Thus, when sodium chromate is the alkali metal chromate in the aqueous solution, the bichromate equivalent is given by the expression (III):

$$B.E. = \frac{298}{2(162)} (T) \qquad (III)$$

in which T is the concentration in weight percent of sodium chromate in the aqueous solution as defined above.

In the practice of the present invention, the aqueous alkali metal chromate solution is contacted with a compound (herein termed a "soluble-silica compound") from which silica (i.e., $SiO_2$) will dissolve in the aqueous alkali metal chromate solution. A wide variety of silica compounds may be used and the precise composition of such compounds is not critical to the present invention. Thus, the soluble-silica compound may comprise one or more of the following: water glass (aqueous solutions of sodium silicate; commercial grades having $Na_2O:SiO_2$ ratios of from about 1:2 to 1:3.25), anhydrous and pentahydrate forms of sodium metasilicate, silicic acid, Ludox (a colloidal dispersion of monomeric silica manufactured by E.I. duPont de Nemours and Company and having a $Na_2O:SiO_2$ ratio of about 1:311), sodium sesquisilicate, sodium orthosilicate and silica flour (a finely divided, amorphous silica).

The amount of soluble-silica compound used to contact the aqueous alkali metal chromate solution will vary widely depending on the amount of alumina present in the solution, the quantity of alumina to be removed, the concentration of soluble silica in the compound, and other factors. Preferably, however, the silica compound is employed in an amount sufficient to provide from about 1 to 24 weight percent CTB $SiO_2$ dissolved in the aqueous alkali metal chromate solution, and most preferably sufficient to provide an amount of dissolved $SiO_2$ equivalent to that amount which is stoichiometrically required to react with the quantity of alumina dissolved in the aqueous alkali metal chromate solution. The stoichiometry referred to above may be determined in accordance with the following equation (IV):

$$Na_2O + 2\ SiO_2 + Al_2O_3 \rightarrow Na_2O \cdot Al_2O_3 \cdot 2SiO_2 \qquad (IV)$$

For a given aqueous alkali metal chromate solution containing alumina, it has been found that deviation from stoichiometry in the addition of the silica compound has an adverse effect upon the effectiveness of alumina removal and that such adverse effect becomes more pronounced with increasing initial alumina content of the aqueous alkali metal chromate solution. This relationship is surprising and may be illustrated by reference to FIG. 1 for an aqueous sodium chromate solution containing 36 weight percent CTB sodium chromate (i.e., a 36 weight percent B.E. yellow liquor), 3.5 weight percent CTB sodium sulfate (calculated as $SO_4^{--}$); 6.4 percent CTB alkalinity (as sodium carbonate;) and 0.35 weight percent CTB $Al_2O_3$.

The soluble-silica compound may be added directly to the aqueous alkali metal chromate solution, either as a solid, or liquid (e.g., an aqueous solution, suspension or dispersion of the silica compound). Alternatively, the aqueous alkali metal chromate solution may be contacted with a solid soluble-silica compound as by pouring the aqueous solution over a bed of the silica compound. Other equivalent methods may be used, and the manner in which the soluble-silica compound and aqueous alkali metal chromate solution are contacted is not critical to the present invention. Thus, the impure aqueous alkali metal chromate solution and an aqueous solution or dispersion of the selected soluble-silica compound may be continuously fed to a container, with continuous separation of the treated liquid from this container (as for example, by allowing liquid to overflow the container), followed by subsequent removal of the precipitated crystals of alkali metal alumino silicate. Likewise, either batch or semi-continuous operation may be employed. Generally, a period of from 0.25 to 5 hours is sufficient in which to react substantially all alumina with the added soluble-silica compound.

The temperature at which the contacting of the aqueous alkali metal chromate solution and the selected soluble-silica compound is effected may vary widely. However, this temperature is preferably from about 70° to 112° C., and more preferably from about 95° to 112° C., at atmospheric pressure. Most preferably, a temperature is used which corresponds to the boiling temperature of the aqueous alkali metal chromate solution. This boiling temperature will, of course, depend on a variety of factors, such as the concentration of alkali metal chromate in the solution, and concentration and type of impurities present in the solution, the pressure employed and other factors. For example, at atmospheric pressure an aqueous solution containing 36 weight percent CTB sodium chromate, 1 weight percent CTB $Al_2O_3$ and 6.4 weight percent CTB alkalinity (as sodium hydroxide) boils at a temperature of about 110° C. To avoid the formation of amorphous solids which are not easily separable from the treated solution, the contact temperature generally should not be less than about 71° C. when sodium chromate solutions are employed. Thus, operation of the present invention allows formation of a crystalline alkali metal alumino silicate precipitate which is easily separable from the treated liquid.

While atmospheric pressure has been found to be quite satisfactory in the practice of the present invention, the pressure employed in the contacting of the aqueous alkali metal chromate solution and soluble-silica compound is not critical and may be higher or lower than atmospheric.

Figure 2:
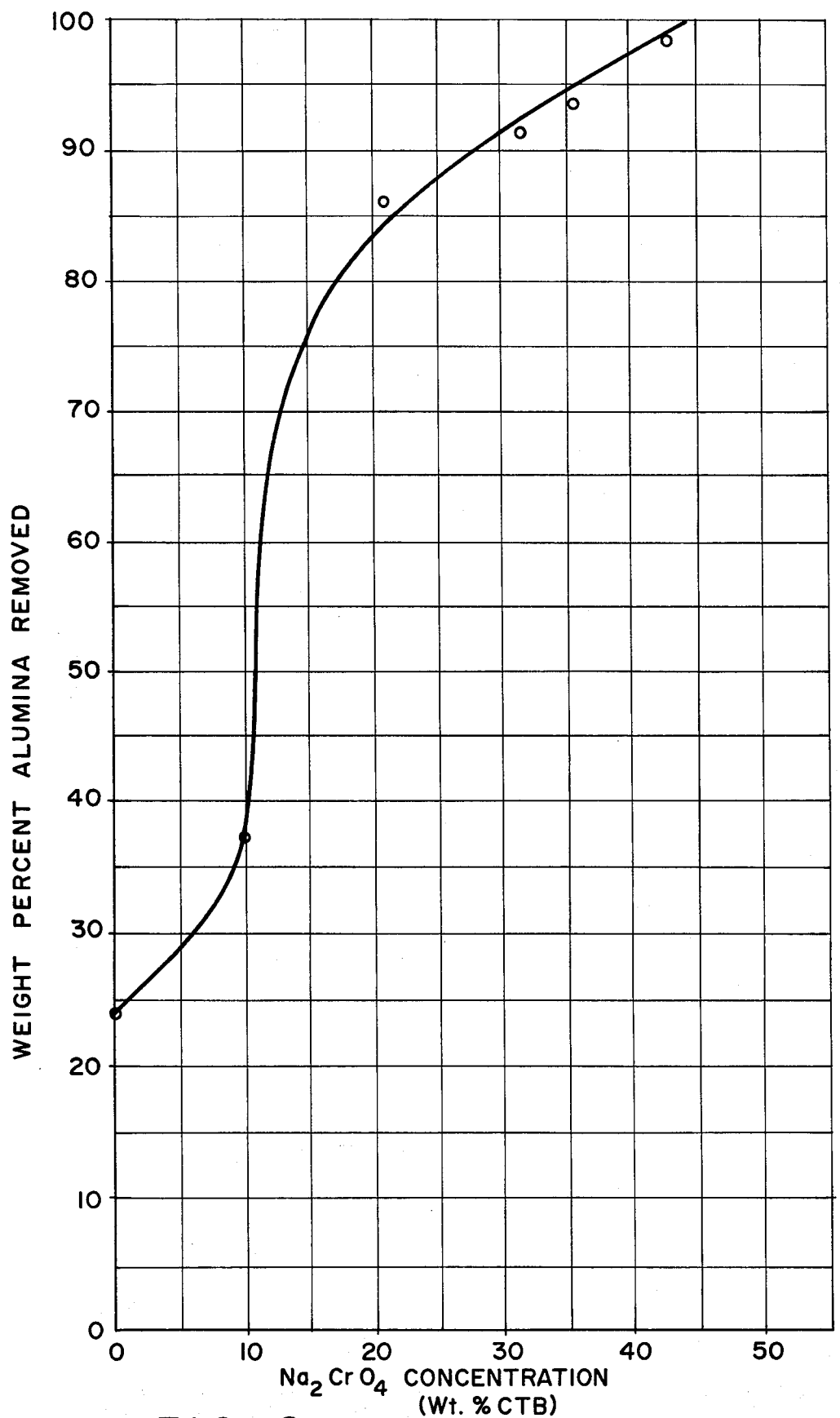
FIG. 2 illustrates the effect which sodium chromate concentration has on alumina-removed efficiency from a sodium chromate solution employing the process of the present invention.

It has been unexpectedly found that the efficiency of alumina removal increases with increasing alkali metal chromate solution concentration. This is seen by reference to FIG. 2 which illustrates the effect which sodium chromate concentration has on alumina removal efficiency for an aqueous sodium chromate solution having an initial alumina content of about 1 weight percent CTB, $Al_2O_3$ which are treated in accordance with the process of the present invention by contacting the solution with an amount of soluble-silica compound necessary to provide a $SiO_2:Al_2O_3$ ratio of about 2:1 and heating the resulting solution under reflux for a period of 30 minutes. The data shown in FIG. 2 may be compared to Example 7, infra.

Thus, in the practice of the present invention, the aqueous alkali metal chromate solution to be treated preferably contains greater than 10 weight percent CTB alkali metal chromate, and most preferably at least about 15 weight percent alkali metal chromate, to allow more efficient removal of alumina as alkali metal alumino silicate solids. If an aqueous alkali metal chromate solution desired to be treated by the process of the present invention contains less than about 10 weight percent CTB alkali metal chromate, the solution may be concentrated with respect to the chromate by conventional means, as by admixing the solution with solid alkali metal chromate or with more concentrated solution thereof. Alternatively, the weak solution may be concentrated by boiling or may be recycled to the leach stage to contact oxidized chromite ore and thereby dissolve additional quantities of alkali metal chromate therefrom. Of course, the contacting of the desired alkali metal chromate solution containing alumina with the selected soluble-silica compound may take place before, during or after the solution is so concentrated. Most preferably, however, the alkali metal chromate solution is concentrated with respect to the chromate content thereof before being contacted with the silica compound.

The aqueous alkali metal chromate solution which is treated in accordance with the process of the present invention may possess a wide range of pH. While the solution will generally be alkaline in view of the alkaline conditions generally employed in the roasting step, this is not critical. Thus, the pH is typically between about 12 and 13.5 for high-lime processes (i.e., those processes having from about 30 to 45 weight percent CTB sodium chromate in the solution) and from about 13 to 14 pH for low- and no-lime processes (i.e., those having from about 15 to 30 weight percent CTB sodium chromate in the aqueous solution).

It is believed that alkalinity in the aqueous alkali metal chromate solutions treated in accordance with the process of the present invention is due to alkali metal hydroxide, formed during leaching of a roasted ore containing excess alkali metal oxide (e.g., $Na_2O$) originally added to the ore roast either as the alkali metal carbonate or hydroxide. However, this should not be considered limiting and it is to be understood that alkalinity in such solutions may be expressed either as pH, percent CTB alkalinity (as alkali metal carbonate) or, as is preferred, percent CTB alkalinity (as alkali metal hydroxide). Further, the pH of the solution may be controlled as, for example, by adding acidic or alkaline materials to the aqueous solution as required. Thus, for example, an alkali metal hydroxide, such as sodium hydroxide may be added to the aqueous solution to increase the pH where desired.

In accordance with a second embodiment of the process of the present invention, the soluble-silica compound may be contacted with the aqueous alkali metal chromate solution at a temperature which is lower than that for formation of the desired alkali metal aluminosilicate crystals. This lower temperature is generally from about 25° to 90° C., and preferably from about 60° to 80° C., and the soluble-silica compound and aqueous solution containing the alkali metal chromate and impurities are allowed to be so contacted for an induction period which generally ranges from about 0.5 to 4 hours, and preferably from about 1 to 2 hours. Following this induction period at the lower temperature, the solution is heated in the presence of a soluble-silica compound to a higher temperature ranging from about 80° to 112° C., and more preferably from about 95° to 112° C., and is maintained at the higher temperature for a period of from about 0.1 to 1 hour. Most preferably, the higher temperature corresponds to the temperature at which the aqueous solution containing soluble-silica compound and impurities boils. The effect of employing an induction period at the lower temperature is to decrease the amount of time at which the solution must be maintaned at the higher temperature, thereby providing an opportunity for savings in terms of heat requirements.

Following the addition of the soluble-silica compound at the selected temperature and pressure, the liquid containing the silica compound is then treated to remove precipitate which is formed. It has been found that the alumina content of the aqueous alkali metal chromate solution is effectively precipitated as an alkali metal alumino silicate and that this precipitate comprises crystals which are easily filterable when practiced in accordance with the preferred operation. The separation of the alkali metal alumino silicate crystals from the treated liquor may be accomplished by any of the conventional methods employed to separate solids from liquids, such as by filtration, centrifuging or by allowing the solids to settle and decanting the liquor.

The alumino silicate solids thus recovered may be water washed to remove any residual bichromate and employed as intermediate in the manufacture of zeolites or as high temperature oxidation catalysts. See, e.g., U.S. Pat. Nos. 3,037,843 and 3,674,709.

The separated liquor comprises a treated alkali metal chromate solution having decreased alumina dissolved therein. The treated solution will generally contain less than about 0.4 weight percent CTB alumina, and preferably not greater than about 0.1 weight percent CTB alumina. However, if higher concentrations than 0.4 weight percent CTB alumina may be tolerated in the equipment used to remove suspended solids in the subsequent processing of the liquor treated by the process of the present invention, then the treated solution may contain greater than 0.4 weight percent CTB alumina.

The separated liquor may be treated as desired for recovery of the alkali metal chromate values therefrom, such as by acidification of the solution to convert the chromate to bichromate values followed by concentration of the liquor and crystallization of the bichromate from the resulting concentrate.

The crystal structure of the crystalline alkali metal alumino silicates formed by the process of the present invention is not known with certainty. For example, the crystalline sodium alumino silicates (i.e., "sodalites") formed by the present invention have been found to produce one of two different sets of X-ray diffraction powder data. For this reason, the formulae of these two types of sodalites have been designated NaAlSiO$_4$.⅓[x] and NaAlSiO$_4$.⅓[y], respectively. The literature compounds most closely approximating the "y" sodalite is the mineral noselite, NaAlSiO$_4$.⅓Na$_2$SO$_4$. See Tomiska and Eugster, Mineral Journal of Japan, Vol. 5, pp. 249–75 (1968). The "x" sodalite formed by the process of the present invention is most similar to a synthetic NaAlSiO$_4$.⅓Na$_2$CO$_3$, formed at a temperature in the range of 500° to 600° C. and high pressures. See Edgar and Burley, Canadian Mineralogist, Vol. 7, p. 631 (1963). A comparison of the X-ray powder data for these sodalites is given below:

| "y" sodalite | | NaAlSiO$_4$ . ⅓Na$_2$SO$_4$ (21-1099*) | | "x" sodalite | | NaAlSiO$_4$ . ⅓Na$_2$CO$_3$ (15-794*) | |
|---|---|---|---|---|---|---|---|
| dA | I | dA | I | dA | I | dA | I |
| 6.40 | 50 | 6.44 | 25 | 6.40 | 30 | 6.36 | 50 |
|  |  | 4.56 | 6 | 5.50 | 5 |  |  |
| 3.70 | 100 | 3.71 | 100 | 4.70 | 50 | 4.69 | 65 |
| 2.75 | 5 | 2.88 | 20 | 4.20 | 15 | 4.15 | 16 |
| 2.62 | 30 | 2.63 | 25 | 3.68 | 100 | 3.66 | 70 |
|  |  | 2.44 | 6 | 3.25 | 70 | 3.23 | 100 |
| 213 | 30 | 2.15 | 14 | 2.75 | 30 | 2.75 | 50 |
|  |  | 1.79 | 8 | 2.60 | 30 | 2.63 | 10 |
|  |  | 1.56 | 4 |  |  | 2.52 | 16 |
|  |  | 1.48 | 4 | 2.44 | 30 | 2.43 | 6 |
|  |  |  |  | 2.28 | 10 | 2.26 | 20 |
|  |  |  |  | 2.18 | 5 | 2.17 | 8 |
|  |  |  |  | 2.12 | 30 | 2.11 | 6 |
|  |  |  |  |  |  | 2.02 | 16 |
|  |  |  |  |  |  | 1.98 | 6 |
|  |  |  |  |  |  | 1.88 | 6 |
|  |  |  |  |  |  | 1.80 | 8 |
|  |  |  |  |  |  | 1.76 | 10 |
|  |  |  |  |  |  | 1.70 | 6 |
|  |  |  |  |  |  | 1.59 | 10 |

*Joint Committee on Powder Diffraction Standards 1971 Reference Number

While it should not be construed in any way as limiting, it is believed the formulae for "y" type sodium alumino silicates can be approximated by: NaAlSiO$_4$.1/12[4NaOH] for sulfate-free liquors and NaAlSiO$_4$.1/12[2NaOH.Na$_2$SO$_4$] for sulfate-containing liquors.

The process of the present invention may be further illustrated by reference to the following examples:

EXAMPLE 1

To determine the effect of contact temperature on the efficiency of alumina removal, 2775 grams of an aqueous sodium chromate solution is prepared containing 36 weight percent CTB sodium chromate, 6.4 weight percent CTB sodium carbonate, 3.5 weight percent CTB $SO_4^{--}$, and 0.35 weight percent CTB alumina and admixed with 12.4 grams of Zenith grade water glass, (manufactured by Allied Chemical Corporation and containing 33.0 weight percent $SiO_2$ and 13.75 weight percent $Na_2O$) at the selected contact temperature and with continuous stirring, for a residence time of from about 15 to 60 minutes. After the heating period, the liquid is filtered to remove the crystalline alumino silicate solids which are formed, and the rate of filtration is noted. The recovered filtrate is analyzed for its residual alumina content. The results of separate runs at atmospheric pressure and different contact temperatures are set forth in Table I below:

TABLE I

| Run | Operating Temp. (° C.) | Residence Time (mins.) | Approximate Filtration Rate (gal/hr/ft²) | Filtrate Analysis-weight Percent Alumina (CTB Basis) |
|---|---|---|---|---|
| 1 | 110 (boiling) | 15 | 300 | 0.05 |
| 2 | 100 | 15 | 250 | 0.10 |
| 3 | 71 | 60 | 9 | 0.20 |

Thus, the above tests show that a decrease of from 110° to 71° C. results in a 30-fold decline in the filtration rate. In run No. 3 the filter cake is observed to be completely amorphous.

EXAMPLE 2

To determine the effect which pH and concentration of sodium carbonate in an aqueous sodium chromate solution has upon the efficiency of alumina removal, 2775 grams of an aqueous sodium chromate solution prepared as in Example 1 and containing either 2.0 or 6.4 weight percent CTB $Na_2CO_3$, is admixed with 12.4 grams of Zenith grade water glass at 110° C. (boiling temperature) and atmospheric pressure for a period 15 minutes. The treated solution is then filtered and the filtrate analyzed, yielding the data set forth in Table II.

TABLE II

| Run | pH | Alkalinity as Weight Percent CTB Sodium Carbonate | Approximate Filtration Rate (gal/hr/ft²) | Filtrate Analysis-Weight Percent CTB Alumina |
|---|---|---|---|---|
| 1 | 13.5 | 6.4 | 300 | 0.05 |
| 2 | 12.5 | 2.0 | 65 | 0.02 |

Thus, the crystallinity decreases with decreasing alkalinity of the aqueous sodium chromate solution.

EXAMPLE 3

To illustrate a batch process for removal of alumina from a sodium chromate solution having a low alumina concentration, an aqueous sodium chromate solution is prepared containing 1088 g. $Na_2CrO_4$, 1535 g. $H_2O$, 24.6 g. $NaAlO_2$ (65%), 41.1 g. NaOH, and 51.8 g. $Na_2SO_4$. The aqueous solution therefore comprises a 36 weight percent B.E. yellow liquor containing 1 weight percent CTB $Al_2O_3$, 7.3 weight percent CTB alkalinity (as $Na_2CO_3$) and 3.5 weight percent CTB $SO_4^{--}$. The liquor is charged to an agitated stainless steel reactor maintained at boiling temperature (110° C.) under reflux. To provide the stoichiometric silica requirement, 39.4 g. of Ajax grade water glass (a water glass manufactured by Allied Chemical Corporation and containing 29.9 weight percent $SiO_2$ and 9.2 weight percent $Na_2O$) is added over a one minute period. Samples are removed at 15 minute intervals after completion of the silica addition (defined as zero time), and filtered for analysis. Results are shown below in Table III:

TABLE III

| Residence Time at Boiling Temperature (Minutes) | Filtrate Content, CTB Basis (Weight Percent) | |
|---|---|---|
| | %$Al_2O_3$ | %$SiO_2$ |
| 15 | .075 | .061 |
| 30 | .061 | .061 |
| 45 | .064 | .061 |
| 60 | .061 | .067 |

All filter cakes were identified by X-ray diffraction as the "y" type sodalite.

EXAMPLE 4

To illustrate a continuous process for removal of low level alumina from sodium chromate solution, an aqueous sodium chromate solution containing 34.6 weight percent CTB sodium chromate, 3.0 weight percent CTB $SO_4^{--}$, 0.52 weight percent CTB $Al_2O_3$, and 9.5 weight percent CTB alkalinity (as $Na_2CO_3$) is pumped continuously at a rate of 3.4 gallons per minute into a 74 gallon agitated, heated stainless steel reactor. Zenith grade water glass is also fed continuously at a rate approximating the stoichiometric silica requirement. The reactor is maintained at boiling temperature (about 109° C.) throughout the run. Alumina and silica analysis of the yellow liquor feed and filtered reactor overflow are shown below:

TABLE IV

| Liquor | Analysis, Weight Percent CTB | |
|---|---|---|
| | $Al_2SO_3$ | $SiO_2$ |
| Yellow liquor feed | .52 | .03 |
| Filtered reactor overflow | .03 | .13 |

The yellow liquor feed rate corresponds to an average residence time in the reactor of 22 minutes. The filter cake is identified by X-ray diffraction as the "y" type sodalite.

EXAMPLE 5

To illustrate a batch process for removal of high level alumina from sodium chromate solution, a solution is prepared which contained 544 g. $Na_2CrO_4$, 651 g. $H_2O$, 155 g. $NaAlO_2$ (65% assay), and 39.6 g. NaOH (equivalent to raising $Na_2O$ content of water glass to $Na_2SiO_3$ value). Thus, this solution comprises a 36 weight percent CTB sodium chromate yellow liquor containing 12.5 weight percent CTB $Al_2O_3$ and 30.5 weight percent CTB alkalinity (as $Na_2CO_3$). The liquor is charged to an agitated stainless steel reactor maintained at 70° C. under reflux. The stoichiometric requirement of Zenith grade water glass (221 g.) is added over a one minute period. After a 50 minute induction period at 70° C., the temperature is incrementally raised to boiling over a 21 minute period and held at boiling temperature (110° C.) for the remainder of the run. Samples are removed at various time intervals after boiling temperature is reached (defined as zero time in Table V) and filtered for analysis. Results are shown below in Table V:

TABLE V

| Residence Time in Minutes at Boiling Temp. | Filtrate Analysis, Weight Percent CTB | |
|---|---|---|
| | Al$_2$O$_3$ | SiO$_2$ |
| 10 | .088 | .26 |
| 20 | .095 | .21 |
| 30 | .11 | .17 |
| 45 | .11 | .22 |

All filter cakes are identified by X-ray diffraction as the "y" type sodalite.

EXAMPLE 6

To illustrate a continuous process for removal of high level alumina from sodium chromate solution, 136 g. Na$_2$CrO$_4$ and 211.5 g. H$_2$O are initially charged to an agitated, stainless steel reactor maintained at boiling temperature (about 110° C.) under reflux, followed by addition of a feed solution containing 136 g. Na$_2$CrO$_4$, 172.8 g. H$_2$O, and 38.7 g. NaAlO$_2$ (65% assay), i.e., a feed solution containing 36 weight percent CTB sodium chromate, 12.5 weight percent CTB Al$_2$O$_3$ and 20 weight percent CTB alkalinity (as Na$_2$CO$_3$). The feed solution is added to the reactor at the rate of one 25 ml. portion every 5 minutes over a 40 minute period. A total of 62.9 g. of Ajax grade water glass, corresponding to the stoichiometric equivalent of 2 SiO$_2$/Al$_2$O$_3$, is also added to the reactor in 5 minute increments. The 5 minute segments are used to ensure that additions are maintained in stoichiometric ratio. After the continuous additions are completed (zero time) samples are removed for various residence times and filtered for analysis. Results are shown below in Table VI:

TABLE VI

| Residence Time in Minutes at Boiling Temp. | Filtrate Analysis, Weight percent CTB | |
|---|---|---|
| | Al$_2$O$_3$ | SiO$_2$ |
| 0 | .092 | .064 |
| 30 | .049 | .090 |
| 60 | .037 | .10 |
| 120 | .043 | .10 |

All filter cakes are identified by X-ray diffraction as the "y" type sodalite.

EXAMPLE 7

To determine the effect which the concentration of alkali metal chromate has upon crystallization of alkali metal alumino silicate, a series of sodium chromate solutions are prepared containing selected concentrations of sodium chromate together with about 1 weight percent CTB Al$_2$O$_3$, 7.3 weight percent CTB alkalinity as Na$_2$CO$_3$ and 3.5 weight percent CTB SO$_4^{--}$ and the solutions are admixed in separate runs with that amount of Ajax water glass which provides a stoichiometric amount of dissolved silica based on the alumina content of the solution. Each admixture is heated at the desired temperature for a period of 30 minutes. At the end of this period, the mixture is allowed to cool to 50° C. and is then passed through a filter to remove the solids that are formed. The solids in each run are then weighed to determine the amount of alumina removed from the solution, and the solids are then analyzed by X-ray diffraction to determine their crystallinity. The data thus obtained are summarized in Table VII below:

TABLE VII

| Run No. | Sodium Chromate Concentration (wt. % CTB) | Temp.* (°C.) | Weight Percent Al$_2$O$_3$ Removed | X-ray Analysis of Crystallinity |
|---|---|---|---|---|
| 1 | 43 | 114 | 99 | sodalite |
| 2 | 36 | 110 | 94 | sodalite |
| 3 | 31 | 107 | 92 | sodalite |
| 4 | 21 | 104 | 86 | amorphous |
| 5 | 10.5 | 102 | 37 | amorphous |
| 6 | 0 | 100 | 23 | amorphous |

*Atmospheric boiling points

Thus, sodium chromate concentrations of 21 weight percent CTB sodium chromate and above results in removal of at least 86 weight percent of alumina initially present in the alkali metal chromate solution. As the 30 minutes of heating in run number 4 provides insufficient opportunity for the precipitated sodium alumina silicate to crystallize, a somewhat longer period of heating would be needed to form crystalline solids from solution in this run and thereby obtain the optimum precipitate form for separation from the treated solution. Also, the Table exemplifies the need to further concentrate the solution of run number 5 with respect to its sodium chromate content in order to obtain a more complete removal of the aluminum present in the initial solution.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

I claim:

1. A process for removing dissolved alumina from an aqueous alkali metal chromate solution containing dissolved alumina and at least 10 weight percent CTB alkali metal chromate which comprises contacting said solution, for 0.25 to 5 hours at a temperature between 70° C. and the boiling point, with a soluble-silica compound in an amount sufficient to provide an amount of dissolved silica substantially equivalent to that amount which is stoichiometrically required to react with the dissolved alumina in said solution to form crystalline alkali metal alumino silicate and removing said crystalline alkali metal alumino silicate from said solution.

2. The process according to claim 1 wherein said alkali metal chromate is a member selected from the group consisting of sodium chromate, potassium chromate and lithium chromate.

3. The process according to claim 1 wherein said aqueous alkali metal chromate solution and said soluble-silica compound are first contacted at a temperature of from about 25° to 90° C. for a period of from about 0.5 to 4 hours and thereafter the temperature is increased to between about 80° to about 112° C. for an additional period of from about 0.1 to 1 hour.

4. The process according to claim 1 wherein said soluble-silica compound is employed in an amount sufficient to provide from about 1 to 24 weight percent CTB SiO$_2$ dissolved in said aqueous alkali metal chromate solution.

* * * * *

UNITED STATES PATENT AND TRADEMARK OFFICE
CERTIFICATE OF CORRECTION

PATENT NO. : 4,173,618
DATED : Nov. 6, 1979
INVENTOR(S) : John W. Holtz

It is certified that error appears in the above-identified patent and that said Letters Patent are hereby corrected as shown below:

Col. 1, line 32: delete "are" and insert -- were --.

Col. 3, line 59: delete "$SO_4$--" and insert -- $SO_4^=$ --.

Col. 5, line 10: delete "$SO_4$--" and insert -- $SO_4^=$ --.

Col. 5, line 11: after "carbonate", delete ";)" and insert -- ); --.

Col. 9, line 4: delete "$SO_4$--" and insert -- $SO_4^=$ --.

Col. 9, line 63: delete "$SO_4$--" and insert -- $SO_4^=$ --.

Col. 10, line 25: delete "$SO_4$--" and insert -- $SO_4^=$ --.

Col. 11, line 55: delete "$SO_4$--" and insert -- $SO_4^=$ --.

Col. 12, line 60: before "112°", delete "about".

Signed and Sealed this

Twenty-second Day of April 1980

[SEAL]

Attest:

SIDNEY A. DIAMOND

Attesting Officer  Commissioner of Patents and Trademarks